United States Patent
Wilkins et al.

(10) Patent No.: US 7,749,569 B2
(45) Date of Patent: Jul. 6, 2010

(54) METHODS FOR IMPROVING CORROSION AND OXIDATION RESISTANCE TO THE UNDER PLATFORM REGION OF A GAS TURBINE BLADE

(75) Inventors: Melvin Howard Wilkins, Milford, OH (US); Lawrence Bernard Kool, Clifton Park, NY (US); Warren Davis Grossklaus, Jr., West Chester, OH (US); Brent Ross Tholke, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/964,977

(22) Filed: Dec. 27, 2007

(65) Prior Publication Data

US 2009/0169750 A1 Jul. 2, 2009

(51) Int. Cl.
*B05D 3/02* (2006.01)

(52) U.S. Cl. .......... 427/372.2; 427/446; 427/374.1; 427/142

(58) Field of Classification Search ............... 427/446, 427/142, 372.2, 374.1
See application file for complete search history.

(56) References Cited

U.S. PATENT DOCUMENTS

2002/0119043 A1* 8/2002 Allen et al. ............ 415/200
2005/0031781 A1* 2/2005 Kool et al. ............ 427/240

* cited by examiner

*Primary Examiner*—Roberts Culbert
(74) *Attorney, Agent, or Firm*—Marcella R. Louke; William Scott Andes; General Electric Company

(57) ABSTRACT

Formation of a silicon-modified aluminide coating on the under platform region of a superalloy gas turbine engine blade for improved corrosion and oxidation resistance. The coating is formed from a slurry composition including colloidal silica and aluminum-based powder and is substantially free of hexavalent chromium. The coating provides aluminum and silicon content in the outer 25% of a coating thickness of at least about 20% by weight aluminum and about 3% by weight silicon.

10 Claims, 4 Drawing Sheets

US 7,749,569 B2

METHODS FOR IMPROVING CORROSION AND OXIDATION RESISTANCE TO THE UNDER PLATFORM REGION OF A GAS TURBINE BLADE

BACKGROUND OF THE INVENTION

This invention relates generally to a corrosion resistant coating for an under platform region of a gas turbine engine turbine blade, methods for applying corrosion resistant coatings, methods for repairing gas turbine engine blades, and corrosion resistant articles.

In an aircraft gas turbine engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forward.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the hot-section components of the engine. These components include the turbine vanes and turbine blades of the gas turbine, upon which the hot combustion gases directly impinge. These components are subject to damage by oxidation and corrosive agents.

Many approaches have been used to increase the operating temperature limits and service lives of the turbine blades and vanes to their current levels. The composition and processing of the base materials themselves have been improved. Cooling techniques are used, as for example by providing the component with internal cooling passages through which cooling air is flowed. Another approach used to protect the hot-section components is to coat a portion of the surfaces with a protective coating such as an aluminum-containing coating. The protective coating oxidizes to produce an aluminum oxide protective layer that protects the underlying substrate.

Leakage and bleed air carry corrosive materials to the non-flowpath sides of turbine blades. Metal salts such as alkaline sulfate, sulfites, chlorides, carbonates, oxides, and other salt deposits resulting from ingested dirt, fly ash, volcanic ash, concrete dust, sand sea salt, etc., are a major source of the corrosion. Other elements in the bleed gas environment can also accelerate the corrosion. Alkaline sulfate corrosion in the temperature range and atmospheric region of interest results in pitting of the turbine blade substrate at temperatures typically starting around 1200° F. (649° C.).

Corrosion pitting has been identified as a cause of fatigue cracking initiation in certain gas engine turbine blades in the under platform region. In the art, the under platform region has been coated with a simple aluminide coating or a platinum aluminide (PtAl) coating. PtAl is the most common coating for the under platform region. Platinum plating control in the complex geometry of the under platform region of the dovetail is very difficult. Platinum aluminide coating is also expensive. Parts with complex coating requirements require difficult masking and in-process strip cycles in order to obtain the proper coating in certain areas and avoidance in other areas. Further, in severe operating conditions, it has been found that PtAl coatings are not sufficient to prevent the corrosion pitting and subsequent fatigue cracking from occurring in the under platform section. The oxidation and corrosion damage can lead to failure or premature removal and replacement of the turbine blades unless the damage is reduced or repaired.

Thus, it would be desirable to provide a coating system and method for protecting certain portions of the turbine blade from corrosion and oxidation.

So-called "silicon-modified" aluminides have been proposed as aluminiding compositions to provide an aluminum-rich region for superalloy substrates in, for example, U.S. Pat. No. 4,310,574 and U.S. Pat. No. 6,126,758. The silicon-modified aluminides may be formed from slurry coatings that can be sprayed or otherwise coated onto the substrate. The volatile components are then evaporated, and the aluminum-containing component can be heated in a manner that causes the aluminum and silicon to diffuse into the substrate surface.

There are advantages to using slurries for aluminiding the substrates. For example, slurries can be easily and economically prepared, and their aluminum content can be readily adjusted to meet the requirements for a particular substrate. Moreover, the slurries can be applied to the substrate by a number of different techniques, and their wetting ability helps to ensure relatively uniform aluminization.

Some aluminum-containing slurry compositions include chromate ions that are known to improve corrosion resistance. While these slurry compositions may be useful for some applications, the chromate ions are considered toxic. In particular, hexavalent chromate ($Cr^{+6}$) is also considered to be a carcinogen. Thus, use of these types of coating compositions results in special handling procedures in order to satisfy health and safety regulations that can increase cost and decrease productivity.

U.S. Pat. No. 7,270,852 provides slurry-type aluminizing compositions for enriching the surface region of a metal-based substrate with aluminum. An exemplary composition includes colloidal silica and particles of an aluminum-based powder and is substantially free of hexavalent chromium.

It would be desirable to provide a suitable coatings and coating methods for the under platform regions of the turbine blades that avoid the difficulties encountered in the art. In particular it would be desirable to provide a coating that provides superior performance over known PtAl coatings, that is free of hexavalent chromium, that may be easily and uniformly applied, and which does not negatively impact the thermal mechanical properties of the underlying substrate.

BRIEF DESCRIPTION OF THE INVENTION

The above-mentioned need or needs may be met by exemplary embodiments which provide a method for providing corrosion and oxidation resistance to an under platform region of a gas turbine blade. An exemplary method includes: a) providing a superalloy gas turbine blade; b) providing a slurry composition comprising colloidal silica and aluminum-based powder that is substantially free of hexavalent chromium; c) applying the slurry composition to a pre-selected portion of the exterior surface of the under platform region; d) subsequent to (c), heating the gas turbine blade under suitable diffusion conditions to form a silicon-modified aluminide coating on the pre-selected portion, wherein the coating exhibits aluminum and silicon content in the outer 25% of a coating thickness of at least about 20% by weight aluminum and about 3% by weight silicon.

In another embodiment, an exemplary method includes: a) providing a gas turbine engine turbine blade exhibiting corrosion in an under platform region; b) preparing at least a pre-selected portion of the under platform region for reception of a substantially hexavalent chromium-free slurry composition; c) forming a silicon-modified aluminide corrosion-resistant coating on at least the under platform region from the slurry composition, wherein the silicon-modified aluminide coating provides corrosion resistance to at least the pre-selected portion comparable to a platinum aluminide coating.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
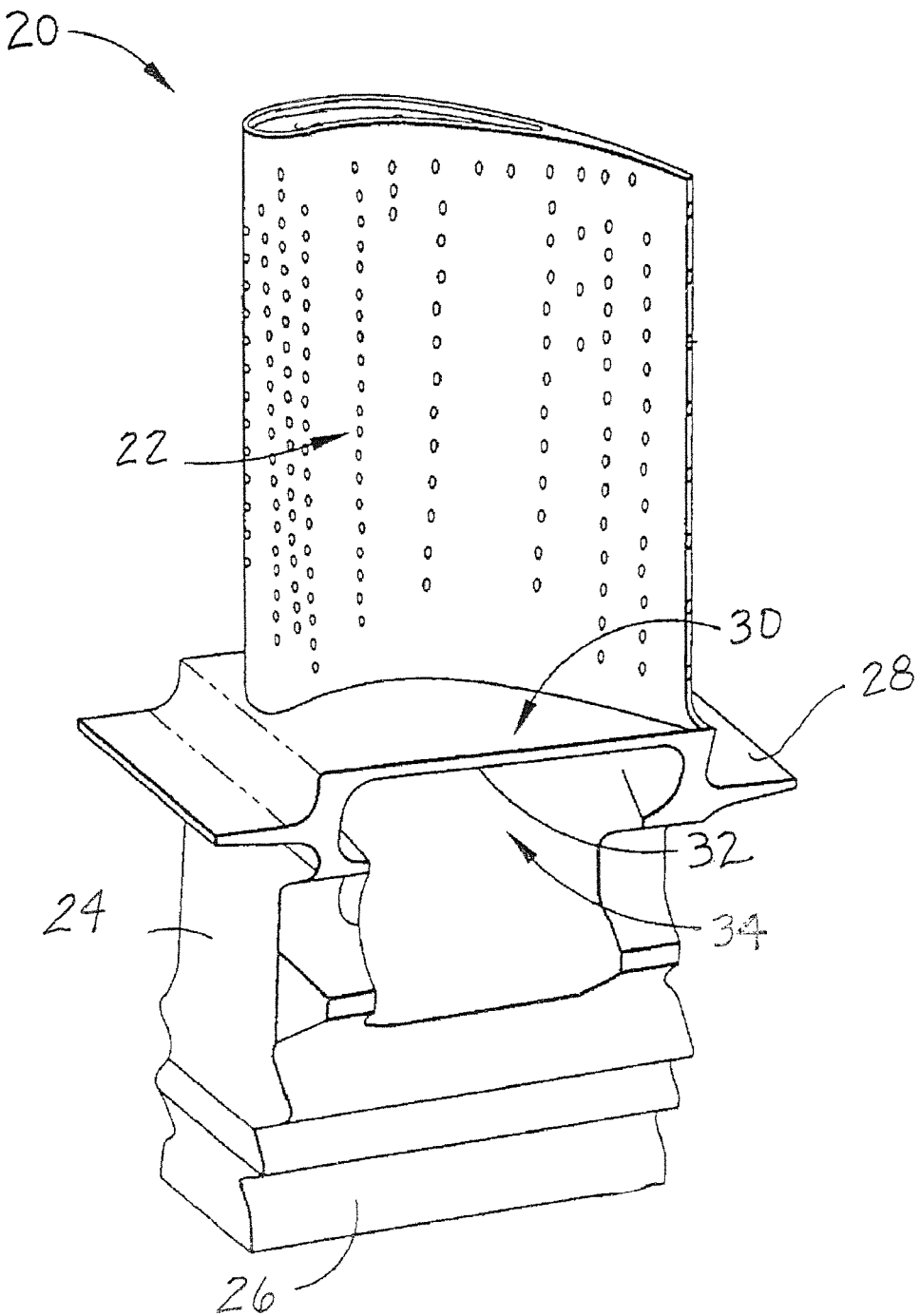
FIG. 1 is a perspective view of a component article such as a gas turbine engine turbine blade.

Referring to the drawing, FIG. 1 depicts a gas turbine blade 20 which has preferably previously been in service, or which may be a new-make article. The gas turbine blade 20 has an airfoil 22 against which the flow of hot combustion gas impinges during service operation, a downwardly extending shank 24, and an attachment in the form of a dovetail 26 which attaches the gas turbine blade 20 to a gas turbine disk (not shown) of the gas turbine engine. A platform 28 extends transversely outwardly at a location between the airfoil 22 and the shank 24 and dovetail 26. The platform 28 has a top surface 30 adjacent to the airfoil 22, and a bottom surface 32 (sometimes termed an "underside" of the platform) adjacent to the shank 24 and the dovetail 26.

The gas turbine blade 20 may be made of a nickel-, iron- or cobalt-base superalloy. In an exemplary embodiment, the gas turbine blade 20 may be a blade which has previously been in service, although new-make articles are also envisioned within the scope of this disclosure. The gas turbine blade 20, which has previously been in service, is manufactured as a new-make gas turbine blade, and then used in aircraft-engine service at least once. During service, the gas turbine blade 20 is subjected to conditions which degrade its structure. Portions of the gas turbine blade are eroded, oxidized, and/or corroded away so that its shape and dimensions change, and coatings are pitted or depleted. Because the gas turbine blade 20 is an expensive article, it is preferred that relatively minor damage be repaired, rather than scrapping the gas turbine blade 20. In an exemplary embodiment, the gas turbine blade 20 may be repaired, refurbished, and rejuvenated so that it may be returned to service. Such repair, refurbishment, and rejuvenation is an important function which improves the economic viability of aircraft gas turbine engines by returning otherwise-unusable gas turbine blades to subsequent service after appropriate processing.

One aspect of the repair in some cases is to apply a protective coating to the bottom surface 32 of the platform 28 and the adjacent portion of the shank 24, herein referred to as the "under platform region 34." Because the under platform region 34 is relatively isolated from the flow of hot combustion gas that impinges against the airfoil 22, it has sometimes been customary in the past that it not be provided with a protective coating. However, as other properties of the gas turbine blade 20 have been improved to allow ever-hotter operating temperatures for increased engine efficiency, it has become apparent that the under platform region 34 may require protective coatings to inhibit and desirably avoid damage from oxidation and corrosion. The embodiments disclosed here are equally applicable to gas turbine blades that have been previously in service and to new-made blades.

In an exemplary embodiment, a corrosion and oxidation resistant coating is formed at the under platform region 34 to prevent corrosion and/or stress corrosion cracking of the blade in that region. While an exemplary embodiment addresses a turbine blade 20, other components exposed to relatively high stress and corrosive conditions would also be expected to benefit from this coating.

In an exemplary embodiment, the corrosion and oxidation resistant coating is a substantially hexavalent chromium-free composition. An exemplary hexavalent chromium-free composition may be utilized as an aluminizing composition elsewhere on the blade. An exemplary composition includes (a) colloidal silica and (b) particles of an aluminum-based powder. In an exemplary embodiment, the colloidal silica is present in the range of about 5% by weight to about 20% by weight, based on silica solids as a percentage of the entire composition. In an exemplary embodiment, the aluminum is present in the range of about 0.5% by weight to about 45% by weight, based on the weight of the entire composition. All percentages disclosed herein are percent by weight unless otherwise noted.

In an exemplary embodiment, the composition comprises an aluminum-based powder; a binder selected from the group of colloidal silica (aqueous-based systems), an organic resin (organic-based systems), and combinations thereof, and, optionally, an inert organic pyrolysable thickener. As used herein "pyrolysable" means capable of thermal decomposition.

Typically, the inert pyrolysable thickener comprises a solid organic particulate thickener. Exemplary structures include beads, yarns, strings, fibers, and combinations thereof. Exemplary materials include acrylics, polymers, and more specifically, poly(methyl methacrylate). An exemplary composition may include a water-soluble polymeric thickener such as polyvinyl alcohol.

As used herein, an "aluminum-based powder" is defined as one that contains at least about 75% by weight aluminum, based on total elements present in the powder. The powder may include other elements such as platinum group metals, rare earth metals, e.g., lanthanides, and elements chemically similar to the lanthanides, such as scandium and yttrium.

In an exemplary embodiment, the slurry composition may include an alloy of aluminum and silicon. The silicon in the aluminum-silicon alloy serves, in part, to decrease the melting point of the alloy, thereby facilitating the coating process.

Other additives may be present in the composition such as pigments, diluents, curing agents, dispersants, deflocculants, anti-settling agents, anti-foaming agents, binders, plasticizers, emollients, surfactants, driers, extenders, and lubricants. Generally, the additives are used at a level in the range of about 0.01% by weight to about 10% by weight, based on the weight of the entire composition.

For aqueous-based compositions, the binder comprises the colloidal silica. As used herein "colloidal silica" means any dispersion of fine particles of silica in a medium of water or another solvent. "Aqueous" refers to compositions in which at least about 65% of the volatile components are water. Other carriers that may be mixed with water include lower alcohols, e.g., 1-4 carbon atoms, and halogenated hydrocarbon solvents.

The amount of liquid carrier employed is usually the minimum amount sufficient to keep the solid components of a slurry in suspension, although other amounts may be used, for example to adjust the viscosity of the composition. Generally, the liquid carrier comprises about 30% by weight to about 70% by weight of the entire composition.

In an exemplary embodiment, the composition includes at least one organic stabilizer that contains at least two hydroxyl groups. The organic stabilizer may be selected from the group consisting of alkane diols, glycerol, pantaerythritol, fats, and carbohydrates. In general, the organic stabilizer is present in an amount sufficient to chemically stabilize the aluminum-based powder during contact with any aqueous component present in the composition. For example, the organic stabilizer may be present at a level in the range of about 0.1% by weight to about 20% by weight, based on the total weight of the composition.

In organic-based composition embodiments, the binder comprises at least one organic resin. A used herein, an "organic-based" composition is meant to describe a material which contains at least one synthetic resin or drying oil as the film-forming component, along with one or more solvents. Some examples of useful organic resins include: epoxy resins, silicone resins, alkyd resins, acrylic resins, polyurethane resins, polyvinyl chloride resins, phenolic resins, polyester resins, urethane resins, polyamide resins, polyolefin resins, and combinations thereof. It may be useful to provide at least one organic solvent selected from alcohols, glycols, ketones, aldehydes, aromatic compounds, dimethylformamide, mineral spirits, naphtha, nitrated hydrocarbons, chlorinated hydrocarbons, and combinations thereof.

In an exemplary embodiment, the composition is provided as a slurry coating composition. The substrate to be coated is formed from a material comprising a nickel-base superalloy, cobalt-base superalloy, or iron-base superalloy. The slurry coating composition is substantially free of hexavalent chromium, comprises a binder selected from the group consisting of colloidal silica, at least one organic resin, and combinations thereof, and particles of an aluminum-silicon alloy which has an average particle size in the range of about 1 micron to about 50 microns; and inert organic polymer thickener beads.

An exemplary embodiment includes an aluminum-based powder component, an aluminum-silicon alloy component, a colloidal silica binder component, and an organic stabilizer component.

An exemplary composition includes about 8% by weight glycerol, about 32% by weight of a colloidal silica binder, about 45% by weight of an aluminum-based powder, and about 15% by weight of an aluminum alloy powder.

Figure 2:
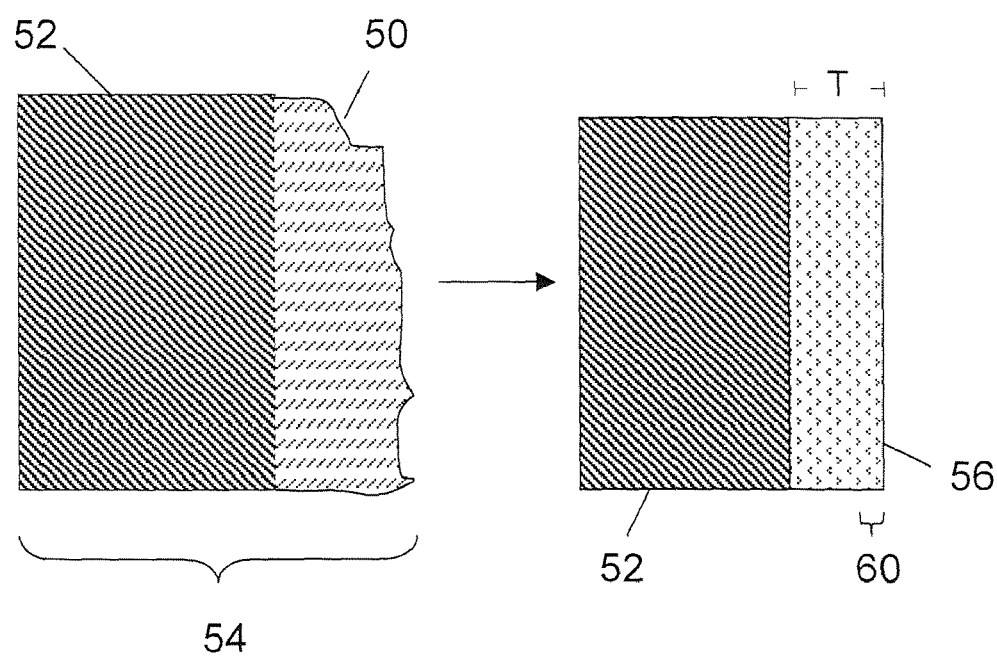
FIG. 2 is a schematic representation illustrating a slurry composition applied to an under platform region of a turbine blade, and a corrosion resistant coating formed thereof.

As illustrated in FIG. 2, a slurry composition 50 may be applied to a pre-determined portion of a substrate 52, e.g., the under platform region of a turbine blade. The slurry composition/substrate assembly 54 is heat-treated to remove volatile components and to form the silicon-modified aluminide diffusion coating 56 wherein aluminum and silicon are diffused into the substrate. An exemplary heat treatment is carried out at a temperature in the range of about 800° C. to about 920° C. Other exemplary heat treatments may include a preliminary heat treatment to remove the volatile components and a final heat treatment to diffuse the aluminum/silicon into the substrate. In an exemplary embodiment, an outer surface region 60 is defined to be about 25% of the coating thickness, T. In an exemplary embodiment, the outer surface region 60 comprises at least about 20% by weight aluminum and from about 1 to about 15% by weight silicon.

Figure 3:
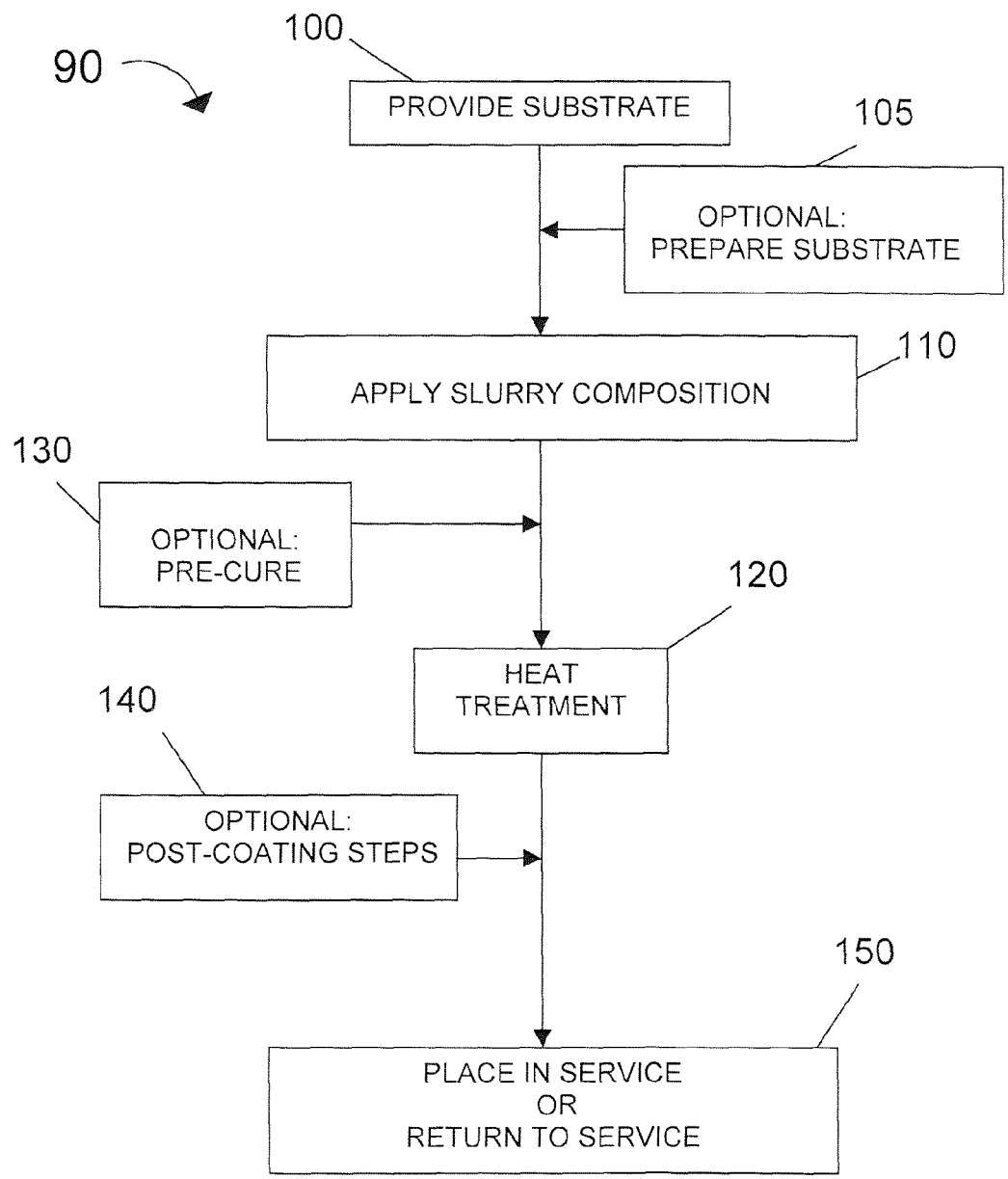
FIG. 3 is a flow chart depicting an exemplary coating process.

In an exemplary embodiment, illustrated by the flow chart of FIG. 3, there is provided a method 90 of coating a pre-selected portion of a gas turbine blade. The method includes the steps of providing a gas turbine blade having an under platform region (Step 100). The method further includes applying a slurry composition to a pre-selected portion of the under platform region (Step 110), wherein the slurry composition comprises a substantially hexavalent chromium-free composition including (a) a colloidal silica and (b) particles of an aluminum-based powder. The slurry composition is able to provide a silicon-modified aluminide coating on the pre-selected portion. The slurry composition is applied to the pre-selected portion by a suitable application method. The application method may be selected from brushing, spraying, pouring, flowing, dipping, rolling, etc., and combinations thereof. In an exemplary embodiment, the slurry composition may be applied in an automated system using robotic sprayers.

The method further includes a suitable heat treatment (Step 120). In an exemplary embodiment, the turbine blade is heated to a pre-selected temperature in the range of about 800° C. to about 920° C. in an environment selected from the group consisting of a vacuum and a protective atmosphere. The heat treatment includes holding the temperature of the gas turbine blade at about the pre-selected temperature for a pre-selected length of time in the range of about 0.5 hours to about 4 hours to diffuse the aluminum and silicon into the pre-selected portion to form a silicon-modified aluminide coating having a thickness in the range of about 0.064 mm.

In an exemplary method, the turbine blade may be "pre-cured" at temperatures of from about 150° F. (66° C.) to about 200° F. (93° C.) to allow visual inspection of the blade for signs of cracking, flaking, excess buildup, or other visible surface defect (Step 130). The "pre-cure" operation allows removal and replacement of the coating before the final heat treatment. Alternately, the coating could "pre-cure" at ambient temperature to achieve similar results.

In an exemplary embodiment, the coating includes a combination of $\beta$-NiAl and $CrS_2$ phases. In an exemplary embodiment, the diffusion heat treatment cycle includes heating under vacuum ($1 \times 10^{-3}$ Torr or lower) at about 900° C. for at least about 4 hours. In an exemplary embodiment, the diffusion coating has a thickness of about 0.064 mm. In an exemplary method, the slurry composition may be applied to a thickness sufficient to provide the desired coating thickness. In an exemplary embodiment, the slurry composition is applied to a thickness about 0.010 mm greater than the desired coating thickness. In an exemplary method, the thickness of the applied slurry composition may be determined by eddy current inspection (ECI) techniques.

The method optionally includes preparing the pre-selected portion for reception of the slurry composition by cleaning, inspecting, and removing any prior corrosion-resistant coatings (Step 105). For example, for a used blade that has previously been in service, any PtAl or aluminide coating may need to be removed from the under platform region. Mechanical means (e.g., grit blasting) or chemical means (e.g., stripping) or any combination thereof may be employed to remove the prior coating. In an exemplary embodiment, the blade may be heated/cooled after coating removal to ensure that all the necessary coating has been removed.

An exemplary method optionally includes post-coating steps such as cleaning and inspecting (Step 140). For example, the outer surface region 60 (FIG. 2) may be inspected to determine the aluminum and silicon content.

Figure 4:
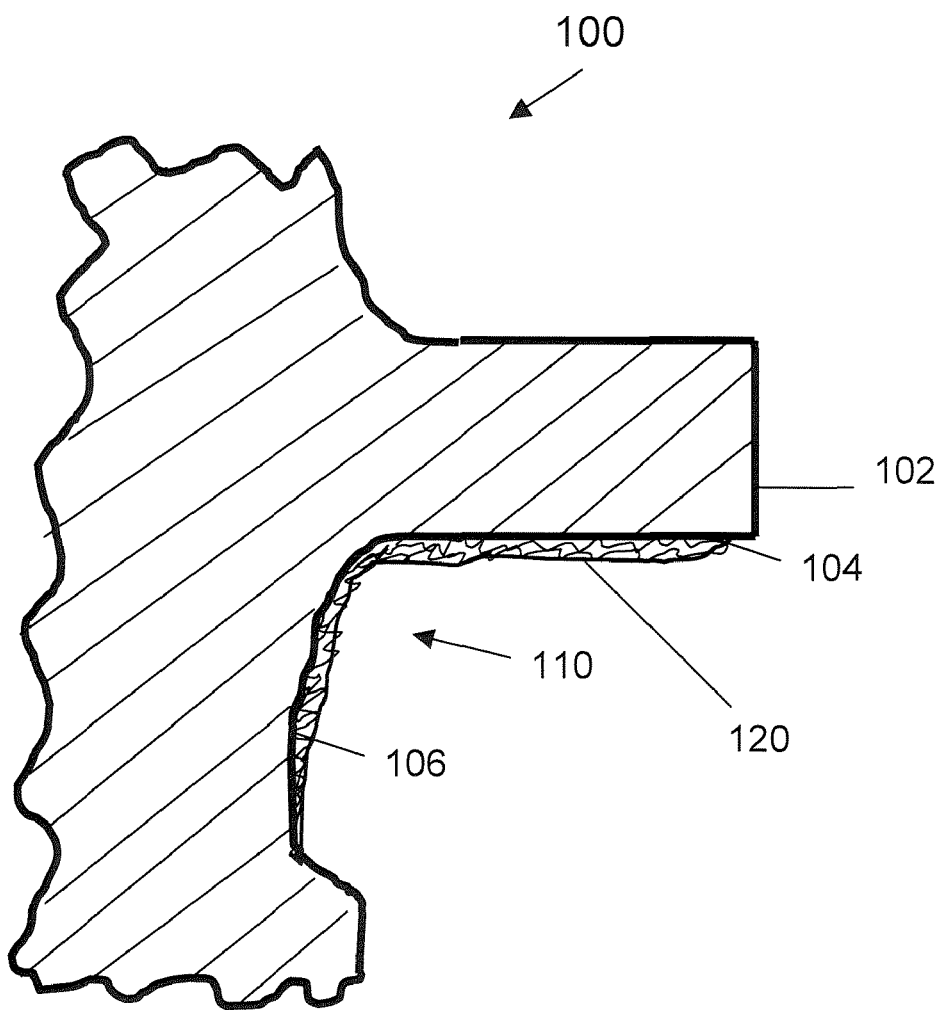
FIG. 4 is a partial cross sectional view showing a coated under platform region of an exemplary turbine blade.

In an exemplary embodiment, the step of providing the gas turbine blade (Step 100) includes providing a blade that exhibits at least one of corrosion or cracking in the under platform region due to prior service use. An exemplary method includes returning the blade to service (repaired blade) or placing the blade into service (new make blade) after the exemplary coating has been formed on the preselected portion of the under platform region (Step 150). In an exemplary embodiment, portions of the blade that will be coated or aluminized at temperatures greater than about 1650° F. (898° C.) are addressed before applying the slurry composition to the under platform region. In another exemplary embodiment, portions of the blade may be coated, for example with environmental or thermal barrier coating systems after an exemplary slurry composition is applied to the under platform region With reference to FIG. 4, an exemplary embodiment includes a gas turbine engine turbine blade 100 comprising a superalloy selected from the group consisting of nickel-base superalloys, iron-base superalloys, cobalt-base superalloys, and combinations thereof. The exemplary blade 100 includes a platform 102, having a bottom surface 104, and a shank portion 106, herein collectively referred to as an under platform region 110. The exemplary blade 100 further includes a silicon-modified aluminide coating 120 on a pre-selected portion of the under platform region 110, wherein the silicon-modified aluminide coating is formed from a substantially hexavalent chromium-free slurry composition including colloidal silica. In an exemplary embodiment, the coating exhibits an aluminum and silicon content in the outer 25% of the coating thickness of at least about 20% by weight aluminum and from about 1 to about 15% by weight silicon. In an exemplary embodiment, aluminum is present in the outer 25% of the coating in an amount of at least about 24% by weight. In an exemplary embodiment, silicon is present in the outer 25% of the coating in an amount of at least about 4% by weight. In an exemplary embodiment, silicon is present in the outer 25% of the coating in an amount of from about 1 to about 10% by weight.

In an exemplary embodiment, the silicon-modified aluminide coating as disclosed herein on the under platform region does not inhibit certain mechanical properties of the blade. For example, low cycle fatigue (LCF) testing on various coated superalloy substrates demonstrates that coatings formed from hexavalent chromium-free slurry compositions disclosed herein compare favorably to known PtAl coatings. As compared with known PtAl coatings, embodiments disclosed herein are substantially weight neutral.

Example 1

Exemplary substrate samples formed from Rene N5 superalloy material were used in demonstration of the feasibility of the coatings in accordance with this disclosure. A hexavalent chromium-free silicon-modified aluminide according to embodiments disclosed herein was applied as a slurry and heat-treated to form an overlay coating on the substrate. The coating thickness was approximately 1.6 mils (40.64 microns). The coating exhibited a combination of β-NiAl and $CrSi_2$ phases. The samples were exposed to a corrandant mixture intended to simulate corrosive materials encountered by the under platform region of turbine blades at normal operating conditions. The corrodant mixture includes sulfate compounds such as $CaSO_4$, $MgSO_4$, $Na_2SO_4$, and $K_2SO_4$. After repetitive exposure cycles where the samples were subjected to the corrodant mixture at elevated temperatures, an inspection of the coating show little to no degradation of the coating. The coating composition also exhibited fine silicon rich phase dispersed throughout the coating.

Similar tests were conducted using coatings having hexavalent chromium, simple aluminides, and PtAl. The non-hexavalent chromium coatings disclosed herein displayed favorable comparative results.

Thus, exemplary slurry compositions disclosed herein applied to the under platform region of a turbine blade are able to provide a corrosion resistant and oxidation resistant coating to enhance high temperature performance. The exemplary methods disclosed herein provide suitable application and heat treatment processes for providing a suitable coating on the under platform region.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for providing corrosion and oxidation resistance to an under platform region of a gas turbine blade, the method comprising the steps of:
   a) providing a gas turbine blade comprising a superalloy selected from the group consisting of nickel-base superalloys, cobalt-base superalloys, iron-base superalloys, and combinations thereof, the blade further comprising an under platform region having an exterior surface;
   b) providing a slurry composition, wherein the slurry composition is substantially free of hexavalent chromium, and wherein the slurry composition comprises colloidal silica and aluminum-based powder;
   c) applying the slurry composition to a pre-selected portion of the exterior surface of the under platform region;
   d) subsequent to (c), heating the gas turbine blade under suitable diffusion conditions to form a silicon-modified aluminide coating on the pre-selected portion, wherein the cure conditions are operably selected to provide at least about 20% by weight aluminum and about 3% by weight silicon in the outer 25% of a coating thickness; and
   e) subsequent to (c), pre-curing the slurry composition under ambient or elevated temperature conditions to form a pre-cured coating and inspecting the pre-cured coating for at least one surface defect selected from cracking, flaking, and excess buildup prior to (d).

2. The method according to claim 1 wherein in (b), providing a slurry composition includes:
   providing a slurry composition including (a) colloidal silica and (b) particles of an aluminum-based powder wherein the colloidal silica is present in the range of about 5% by weight to about 20% by weight, based on silica solids, and wherein aluminum is present in the range of about 0.5% by weight to about 45% by weight of the total composition.

3. The method according to claim 1 wherein in (d), heating the gas turbine blade includes:
   heating the gas turbine blade to a pre-selected temperature in the range of about 800° C. to about 920° C. in an environment selected from the group consisting of a vacuum and a protective atmosphere; and holding the temperature of the gas turbine blade at the pre-selected temperature for a pre-selected length of time in the range of about 0.5 hours to about 8 hours to diffuse the aluminum and silicon into the pre-selected portion to form a corrosion and oxidation resistant coating.

4. The method according to claim 1 wherein in (a), providing the gas turbine blade includes providing a gas turbine blade selected from the group consisting of a new make blade, and a used blade needing repair in at least an under platform region thereof.

5. The method according to claim 4 wherein the gas turbine blade is a used blade in need of repair, the method further including:
removing a prior coating, if present, from at least the pre-selected portion.

6. The method according to claim 1 further including:
prior to (c), preparing at least the pre-selected portion for reception of the slurry composition.

7. The method according to claim 1 wherein in (c), applying the slurry composition includes utilizing at least one application technique selected from brushing, spraying, pouring, flowing, dipping, rolling.

8. The method according to claim 1 wherein in (c), applying the slurry composition includes utilizing robotic sprayers in an automated application system.

9. The method according to claim 1 including:
removing at least one portion of the pre-cured coating upon detection of the at least one surface defect.

10. The method according to claim 9 including:
replacing the removed pre-cured coating with additional slurry composition.

* * * * *